US009329014B1

(12) United States Patent
Reese et al.

(10) Patent No.: US 9,329,014 B1
(45) Date of Patent: May 3, 2016

(54) HORIZONTAL-REEL TAPE MEASURE

(71) Applicant: Sears Brands, L.L.C., Hoffman Estates, IL (US)

(72) Inventors: Brian Todd Reese, St. Charles, IL (US); Cody Lyle Mayer, Chicago, IL (US)

(73) Assignee: SEARS BRANDS, L.L.C., Hoffman Estates, IL (US)

( * ) Notice: Subject to any disclaimer, the term of this patent is extended or adjusted under 35 U.S.C. 154(b) by 0 days.

(21) Appl. No.: 14/880,599

(22) Filed: Oct. 12, 2015

(51) Int. Cl.
*G01B 3/10* (2006.01)

(52) U.S. Cl.
CPC ............ *G01B 3/1041* (2013.01); *G01B 3/1005* (2013.01); *G01B 2003/1033* (2013.01); *G01B 2003/1053* (2013.01)

(58) Field of Classification Search
CPC ..................... G01B 2003/1053; G01B 3/1041; G01B 3/1005
USPC .............................. 33/769, 755, 759, 761, 767
See application file for complete search history.

(56) References Cited

U.S. PATENT DOCUMENTS

| | | | | |
|---|---|---|---|---|
| 2,131,695 | A * | 9/1938 | Stowell | G01B 3/1041 33/766 |
| 2,776,448 | A | 1/1957 | Trammell, Jr. | |
| 3,314,516 | A * | 4/1967 | Runde | B41J 29/42 33/761 |
| 3,493,190 | A * | 2/1970 | Quenot | G01B 3/1041 242/381.1 |
| 3,494,038 | A * | 2/1970 | Quenot | G01B 3/1041 242/397.5 |
| 4,155,168 | A * | 5/1979 | DuBois | G01B 3/1005 242/387 |
| 4,924,597 | A | 5/1990 | Tursi | |
| 5,845,412 | A | 12/1998 | Arcand | |
| 6,595,451 | B1 | 7/2003 | Kang et al. | |
| 7,107,700 | B2 * | 9/2006 | Lewis | G01B 3/1041 33/755 |
| 7,251,904 | B2 * | 8/2007 | Lewis | G01B 3/1041 33/755 |
| 7,451,552 | B2 * | 11/2008 | Haglof | G01B 3/1041 33/756 |
| 2014/0109417 | A1 | 4/2014 | Kocenko | |
| 2015/0107128 | A1 * | 4/2015 | Kar Ho | G01B 3/1041 33/758 |

OTHER PUBLICATIONS

Milwaukee Introduces New Tape Measures Ideal for Layout, Milwaukee Tool, dated Jan. 12, 2015, 2 pages.
U.S. Appl. No. 14/840,892, filed Aug. 31, 2015, 49 pages.

* cited by examiner

*Primary Examiner* — Christopher Fulton
(74) *Attorney, Agent, or Firm* — McAndrews, Held & Malloy, Ltd.

(57) ABSTRACT

Various embodiments of tape measures having a horizontally mounted reel are described. Some tape measures include a plurality of guide members that twist and guide a measuring tape blade as the measuring tape blade is uncoiled from the reel and extended through a slot in the tape measure casing. In some embodiment, the plurality of members include a bottom guide member between the reel and a bottom wall of the casing, a side guide member between the reel and a side wall of casing, and a variable-diameter guide member between the bottom roller and the side roller. In some embodiment, the variable-diameter roller is formed from the reel and a coiled portion the measuring tape blade.

20 Claims, 9 Drawing Sheets

HORIZONTAL-REEL TAPE MEASURE

FIELD OF THE INVENTION

Various embodiments relate to a retractable tape measure, and more particularly, to a retractable tape measure having a horizontal tape reel.

BACKGROUND OF THE INVENTION

A retractable tape measure may include a body, a tape reel, and a measuring tape blade. The body houses the reel and at least a portion of the measuring tape blade that is wound around the reel. The tape reel and wound tape blade generally form a cylinder having a larger diameter (e.g., 4 inches) than height (e.g., 1.5 inches). The body generally conforms to the tape reel and thus generally also has a cylindrical shape. The body further includes a slot that is parallel to a bottom surface of the tape measure. A distal end of measuring tape blade may extend through the slot to permit extending the tape blade from the body. A tab or hook may be affixed to the distal end of the measuring tape blade. The tab may permit the distal end of the measuring tape blade to be secured to an object.

Many tape measures mount the tape reel in the body such that an axis of rotation extends parallel to a bottom surface of the body and perpendicular to left and right sides of the body. Such mounting generally aligns the tape blade such that an upper face of the tape blade is parallel with the bottom surface of the body and the slot as the tape blade uncoils from the tape reel near the bottom surface of the body. Such mounting of the tape reel further results in the tape measure having a narrow base and high center of gravity due to the diameter of the tape reel extending vertically up from the bottom surface of the tape measure body. Due to such vertical orientation of the tape reel, vertical-reel tape measures have a propensity to tip over during use. Tipping over lowers the center of gravity and stabilizes the tape measure. However, tipping over also reorients the tape reel such that the slot is no longer parallel to the surface upon which the tape measure rests, but is perpendicular to such surface. Moreover, such tipping over further twists the extended tape blade such that the upper face of the tape blade is no longer parallel to the surface upon which the tape measure rests, thus making it difficult to obtain an accurate measure.

To address the above issue, some tape measures utilize a horizontal tape reel having an axis of rotation that is perpendicular to a bottom surface of the tape measure body. Despite the axis of rotation of the horizontal-reel tape measure being reoriented with respect to the vertical-reel tape measure, the horizontal-reel tape measure still provides a slot that is parallel to the bottom surface in order to present the tape blade such that an upper face of the tape blade is parallel to the surface upon which the bottom surface rests. In order to achieve such an orientation of the extended tape blade, the horizontal-reel tape measure internally twists the tape blade as it is unwound from the horizontal tape reel. To accommodate such internal twisting of the tape blade, horizontal-reel tape measures have historically exhibited a larger and/or different shaped housing than a vertical-tape tape measure of similar tape blade length. Given the prevalence of vertical-reel tape measures, the larger housings may be perceived as bulky or unwieldy. Moreover, the different shaped housing may be perceived as having an odd, undesirable shape.

Limitations and disadvantages of conventional and traditional approaches should become apparent to one of skill in the art, through comparison of such systems with aspects of the present invention as set forth in the remainder of the present application.

BRIEF SUMMARY OF THE INVENTION

Horizontal-reel tape measures are substantially shown in and/or described in connection with at least one of the figures, and are set forth more completely in the claims.

Advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

DETAILED DESCRIPTION OF THE INVENTION

Figure 2:
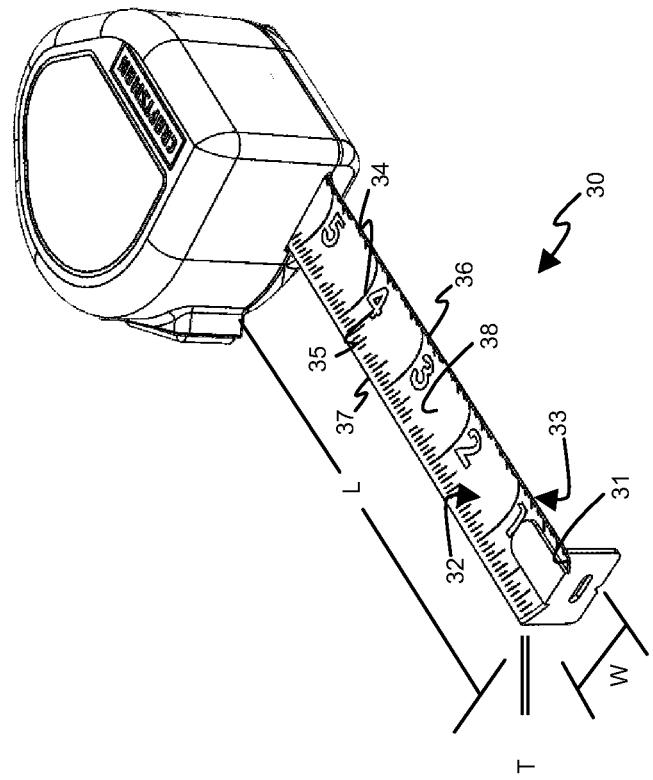
FIG. 2 provides a perspective view of the tape measure from FIG. 1 with its tape blade partially extended.
Figure 1:
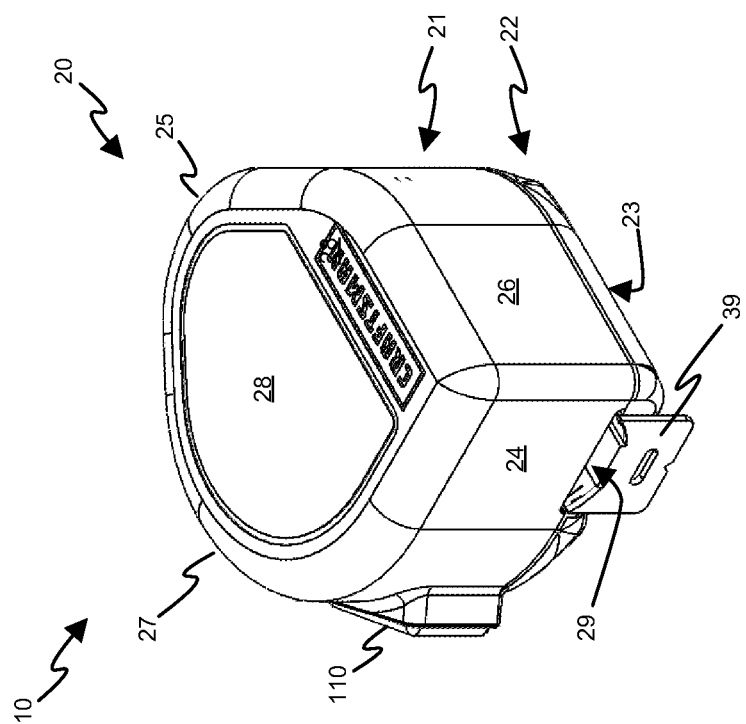
FIG. 1 provides a perspective view of a horizontal-reel tape measure in accordance with an embodiment of the present invention.
Figure 4:
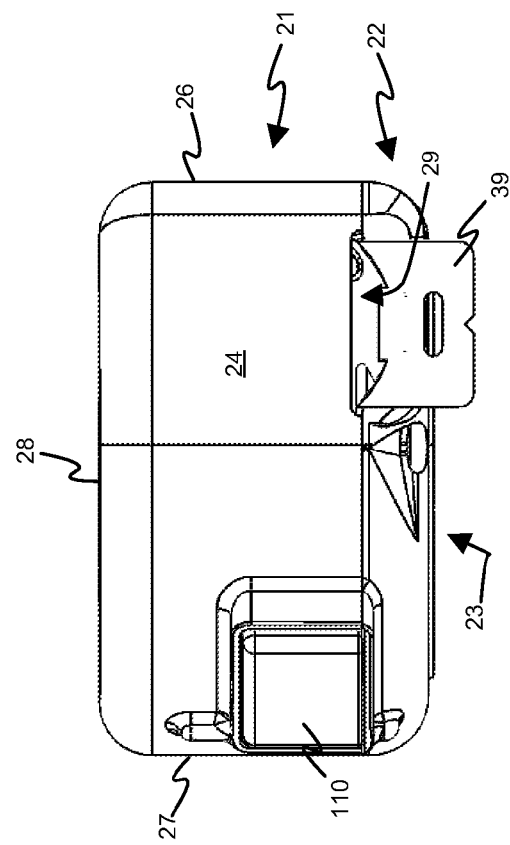
FIG. 4 provides a view of the front of the tape measure of FIG. 1
Figure 3:
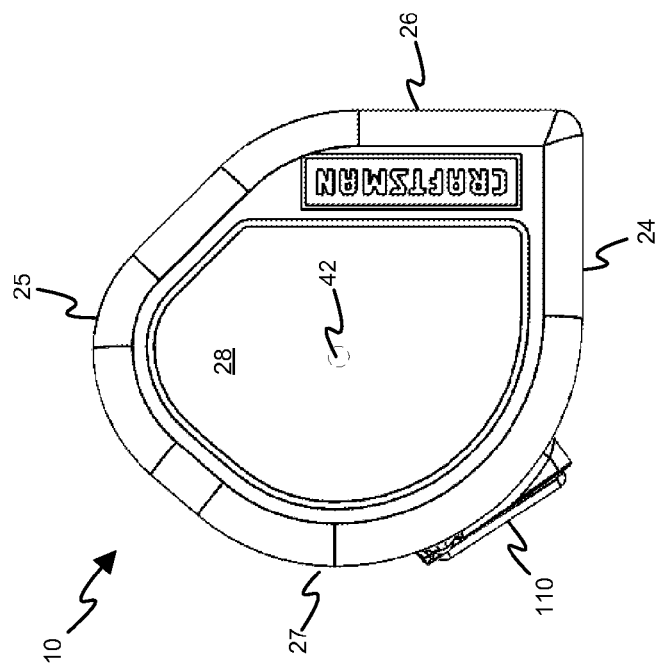
FIG. 3 provides of view of the top of the tape measure from FIG. 1.
Figure 6:
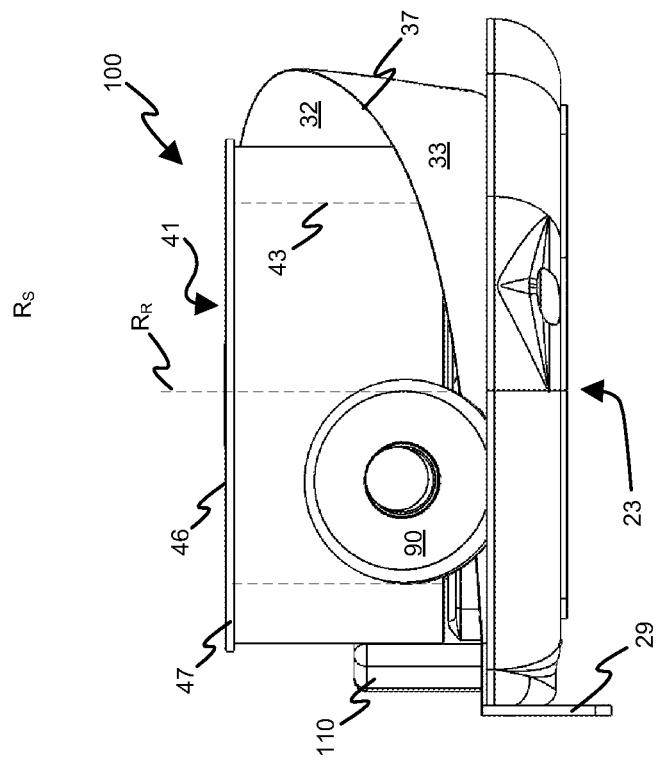
FIG. 6 provides a view of the left of the tape measure from FIG. 1 with an upper portion of the casing removed.
Figure 5:
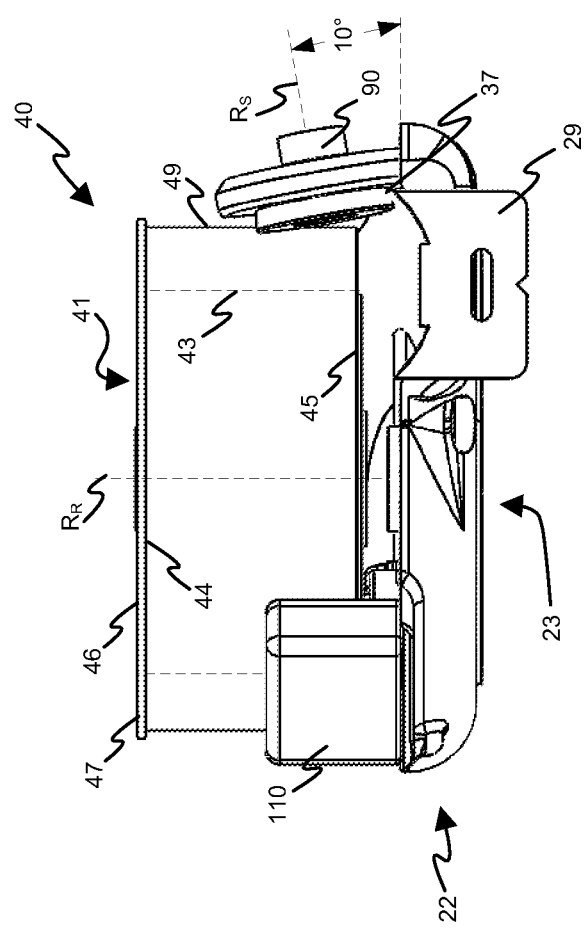
FIG. 5 provides a view of the front of the tape measure from FIG. 1 with an upper portion of the casing removed.

Aspects of the present invention are generally related to retractable tape measures. More specifically, certain embodiments of the present invention relate a retractable tape measure having a horizontal tape reel. Certain embodiments of the horizontal-reel tape measure further include a brake that automatically retains the tape blade in an extended position until released.

Referring now to FIGS. 1-4, a horizontal-reel, retractable tape measure 10 is shown. The tape measure 10 may include an outer casing or housing 20 defined by one or more outer walls. In one embodiment, the casing 20 comprises an upper portion 21 and a lower portion 22. The lower portion 22 generally defines a bottom wall 23 of the tape measure 10. The upper portion 21 generally defines a front wall 24, a back wall 25 opposite the front wall 24, a left wall 26, and a right wall 27 opposite the left wall 26. Moreover, the upper portion 21 further includes a top wall 28 that is opposite the bottom wall 23 when the upper portion 21 is joined with the lower portion 22. The casing 20 is generally depicted as having a two-portion, clamshell-like construction. The casing 20, in other embodiments, may be formed from a different number of casing portions 21, 22 or the casing walls 23-27 may be apportioned to the various potions 21, 22 in a different manner.

The tape measure 10 may further include a measuring tape blade 30. The blade 30 may comprise a long, narrow strip of metal or other flexible material such as, for example, cloth, plastic, or fiber glass. The blade 30 may have a long length L (e.g., 25 feet), a narrow width W (e.g., 1 inch), and a minor thickness T (e.g., 0.1 millimeters) that define an upper face 32 and a lower face 33 of the blade 30. The blade 30 may further include measurement markings 34 on the upper face 32, the lower face 33, or both. The markings 34 may be spaced at regular intervals (e.g., every sixteenth of an inch) and may have associated labels 35 to assist a craftsperson in obtaining a measurement reading.

The blade 30 may have concavo-convex transverse cross section in which the upper face 32 is concave and the lower face 33 is convex. As a result, a left edge 36 and right edge 37 of the blade 30 lie in a higher horizontal plane than a center portion 38 of the blade 30. The blade 30 may extend through an elongated slot 29 in the front wall 24 near the bottom-left corner of the casing 20. The slot 29 generally has a longitudinal axis that runs parallel to the bottom wall 23. Moreover, the edges 36, 37 of the blade 30 are generally associated with distal ends of the slot 29 as the blade 30 extends through slot 29. Accordingly, the upper face 32 of the blade 30 normally faces opposite an outer surface of the bottom wall 23 when extended from the slot 29.

The blade 30 may further include a hook or tab 39 that is attached to a distal end 31. A craftsperson may use the tab 39 to secure the distal end 31 of the blade 30 to an object to be measured. Moreover, the tab 39 may be dimensioned such that the tab 39 is too large to pass through the slot 29 in the front wall 24 of the casing 20. Such dimensioning of the slot 29 and hook 39 ensures that the distal end 31 of the blade 30 is not retracted into an interior of the casing 20.

Referring now to FIGS. 1-8, a proximal end of the blade 30 may be attached to a spring-loaded, tape reel 40 of the tape measure 10. The tape measure 10 may provide a vertical axle 42 upon which the tape reel 40 is rotatably mounted. The vertical axle 40 may extend centrally, between the bottom wall 23 and the top wall 28 of the casing 20. The vertical axle 42 generally provides the tape reel 40 with an axis of rotation $R_R$ that is perpendicular to the bottom wall 23 and the top wall 28 of the casing 20.

The tape reel 40 may include a central drum 43 shaped as a right, circular cylinder having a larger diameter $D_D$ than height $H_D$. See, e.g., FIG. 10. The drum 43 is generally shown in phantom due to the drum 43 being hidden by the tape blade 30 coiled about the drum 43. The drum 43 includes an upper end 44 near the top wall 28 and a lower end 45 near the bottom wall 23 of the casing 20. The blade 30 may be wound around the drum 43 with its concave upper face 32 facing inwardly toward the axis of rotation $R_R$ of the reel 40 and with its convex lower face 33 facing outwardly from the axis of rotation $R_R$ of the reel 40. The height $H_D$ of the tape reel drum 43 may be slightly greater than the width W of the tape blade 30 to permit the drum 43 to completely receive the upper face 33 of the tape blade 30 as the tape blade 30 is coiled about the tape reel 40.

The upper end 44 of the drum 43 may be capped with a circular disc 46. Furthermore, the disc 46 may have a diameter $D_C$ that is larger than diameter $D_D$ of the drum 43 in order to provide a lip 47 that extends radially beyond the drum 43. The lip 47 may act as a guide during coiling and uncoiling of the tape blade 30. In particular, the lip 47 may prevent the left edge 36 of the tape blade 30 from sliding past the upper end 44 of the drum 43.

As explained above, the slot 29 runs parallel or substantially parallel with the bottom wall 23. Moreover, the measuring tape blade 30 may be directed through the slot 29 such that the width W of the blade 30, which is parallel with the vertical axle 42 when the blade 30 is wound around the reel 40, is twisted such that the width W is perpendicular to the vertical axle 42 and thus parallel with the longitudinal axis of the slot 29 and the bottom wall 23 of the casing 20 when the blade 30 passes through slot 29. As a result, the blade 30 may extend from the slot 29 such that the measuring tape blade 30 generally extends along a plane defined by the bottom wall 23 of the casing 20. See, e.g., FIG. 2.

As noted above, the tape measure 10 includes a bottom roller 70 and a side roller 90. See, e.g., FIGS. 9 and 10. The bottom roller 70 may be rotatably mounted to the bottom wall 23 below the tape reel 40 with its axis of rotation parallel $R_B$ with the axis of rotation $R_R$ of the tape reel 40. The side roller 90 may be rotatably mounted in the left wall 26 with its axis of rotation $R_S$ oriented nearly parallel (10° off) to the plane in which the disc 46 lies and thus transverse to the axis of rotation $R_R$ of the tape reel 40.

The tape measure 10 may further includes a plurality of guide members 70, 90, 100 which cooperate to guide and twist the blade 30 as the blade 30 travels along a blade path between the slot 29 and the reel 40. As noted above, the upper face 32 of the blade 30 is coiled around the reel 40 such the upper face 32 lies against a surface of the drum 43 and is thus generally perpendicular to the bottom portion 22 of the tape measure 10. However, the upper face 32 upon exiting the extending slot 29 is twisted such the upper face 32 is directed upward and opposite an outer surface of the bottom portion 22 of the tape measure 10. Thus, the upper face 32 of the extended portion of the tape blade 30 is generally parallel to the bottom portion 22 of the tape measure 10. The guide members 70, 90, 100 cooperate to effectuate such a reorientation or twisting of the blade 30 such that the upper face 32 may be directed in the appropriate direction when interfacing with the drum 43 and when interfacing with the slot 29.

To this end, the tape measure 10 may include a bottom guide member 70, a side guide member 90, and a variable-diameter guide member 100. As explained in greater detail below, the guide members 70, 90, and 100, in one embodiment, each include a rotatable roller having a circular cross section. However, in other embodiments, bottom guide member 70, side guide member 90, or both may be implemented as a fixed, non-rotatable surface that interfaces with the blade 30 to effectuate the above described guiding and twisting of the blade 30 as it travels between the reel 40 and the slot 29. To this end, the guide members 70, 90 may comprises the rollers described below, but mounted in a fixed, non-rotatable manner. In other embodiments, the guide members 70, 90 may be implemented as extensions or protrusions of the casing 20, which provide surfaces that interact with the blade 30 in a manner similar to the below disclosed rollers. In such embodiments, the guide members 70, 90 are unlikely to have a circular cross section since such guide member 70, 90 do not rotate.

Details in which the guide members 70 and 90 are implemented via rollers is presented below. In the interest of brevity, the guide members 70 and 90 are generally referred to as rollers 70 and 90 with respect to the below description. However, many aspects of the below described roller embodiment of the guide members 70 and 90 are generally applicable to a fixed, surface embodiment of the guide members 70 and 90.

Figure 10:
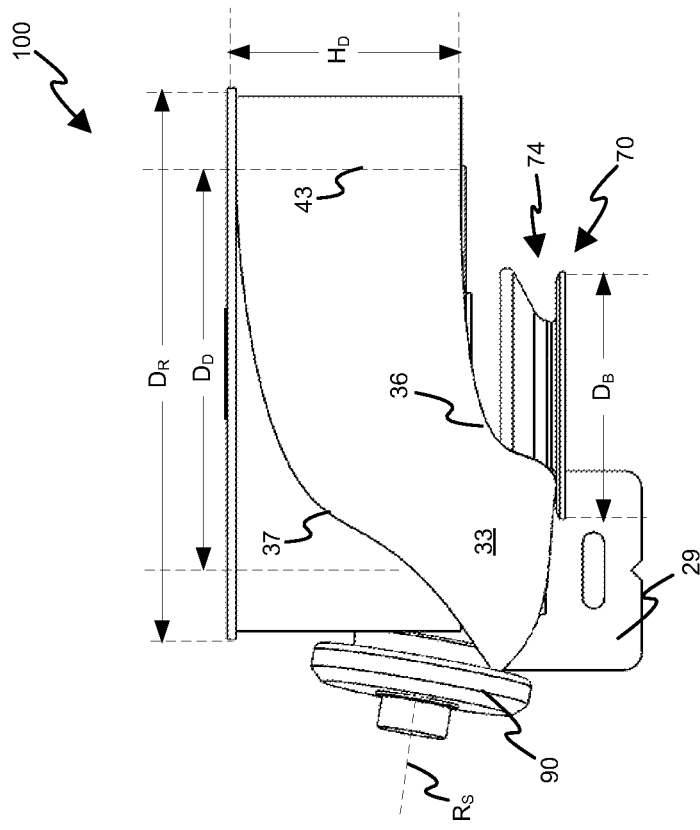
FIG. 10 provides a view of the back of the tape measure from FIG. 1 with the casing and brake removed.
Figure 9:
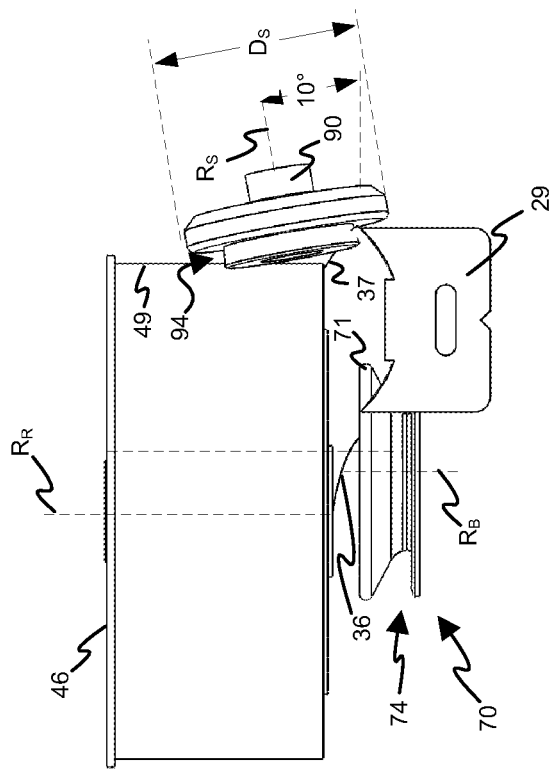
FIG. 9 provides a view of the front of the tape measure from FIG. 1 with the casing and brake removed.

As shown in FIGS. 9 and 10, the bottom guide member or roller 70 may be mounted below the reel 40 such that its axis of rotation $R_B$ is parallel to the axis of rotation $R_R$ of the reel 40. Moreover, the bottom roller 70 may be positioned such that its axis $R_B$ is lies between the axis $R_R$ of the reel 40 and the back wall 25. As shown, the outer diameter $D_B$ of the bottom roller 70 may be considerably smaller than the diameter $D_R$ of the reel 40. In one embodiment, the diameter $D_B$ of the bottom roller 70 may be roughly half the diameter $D_R$ of the reel 40. As shown, the bottom roller 70 may be further positioned such that its axis $R_B$ is offset from the reel axis $R_R$ in the direction of the side roller 90. While offset toward the side roller 90, the bottom roller 70 may be positioned such that the bottom roller 70 does not extend beyond a left side 48 of the reel 40. In particular, the bottom roller 70 may be positioned such that the left side 72 of its inner groove 74 is roughly the width W of the blade 30 from the left side 49 of the reel 40.

Figure 8:
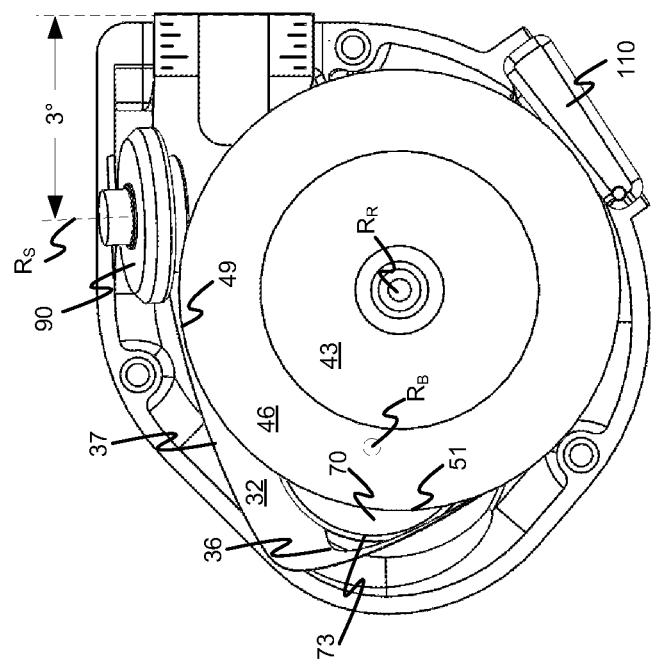
FIG. 8 provides a view of the top of the tape measure from FIG. 1 with an upper portion of the casing removed.
Figure 7:
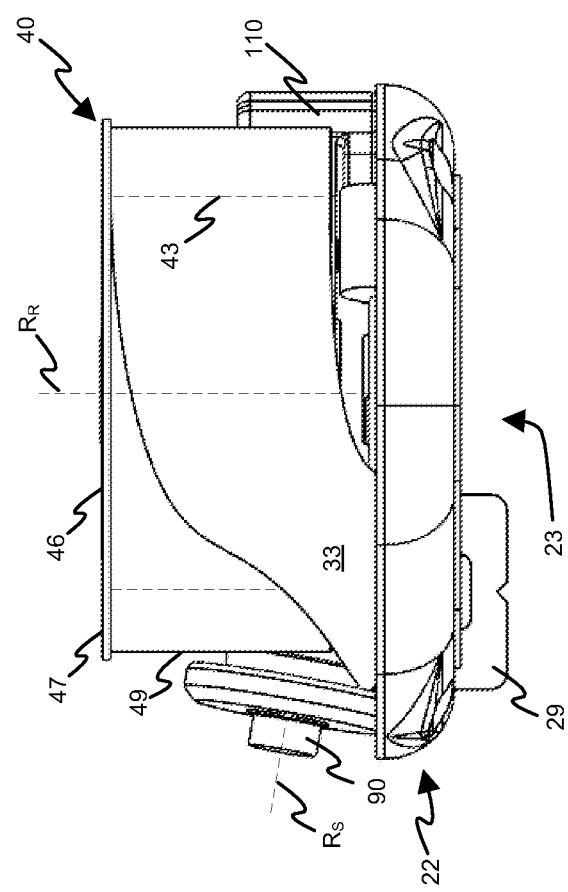
FIG. 7 provides a view of the back of the tape measure from FIG. 1 with an upper portion of the casing removed.

While the bottom roller 70 may be positioned such that left side 71 of the bottom roller 70 does not extend beyond the left side 49 of the reel 40, the bottom roller 70 may be positioned such that a back side 75 of the bottom roller 70 extends beyond the back side 51 of the reel 40 as shown in FIG. 8. Such positioning enables the bottom roller 70 to engage the right side 37 of the blade 30 and guide the tape blade 30 away from a back side 51 of the reel 40 in order to provide sufficient clearance to twist of the tape blade 30 toward the desired orientation. However, while the bottom roller 70 extends beyond the back side 51 of the reel 40, the bottom roller 70 remains predominantly within the footprint of the reel 40 as projected upon the bottom portion 22. Such an overlap in the vertical footprint of the bottom roller 70 and the reel 40 enables the casing 20 to conform closely with the shape of the reel 40 and reduce the overall size of the tape measure 10.

Figure 11:
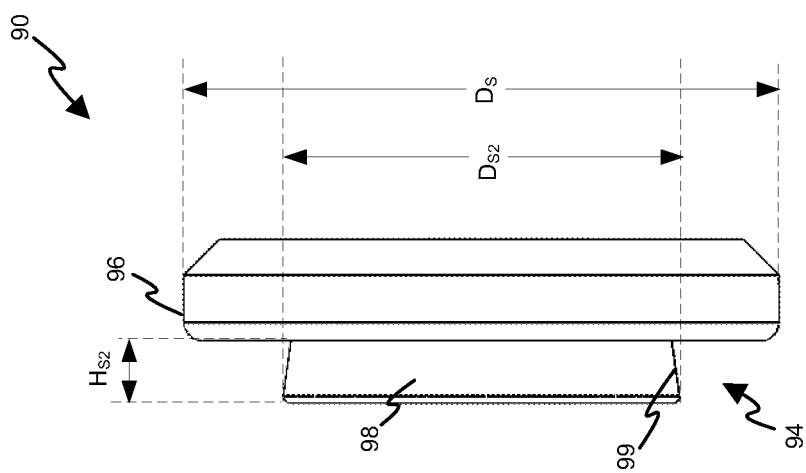
FIG. 11 provides a detailed view for the side roller of the tape measure from FIG. 1.
Figure 14:
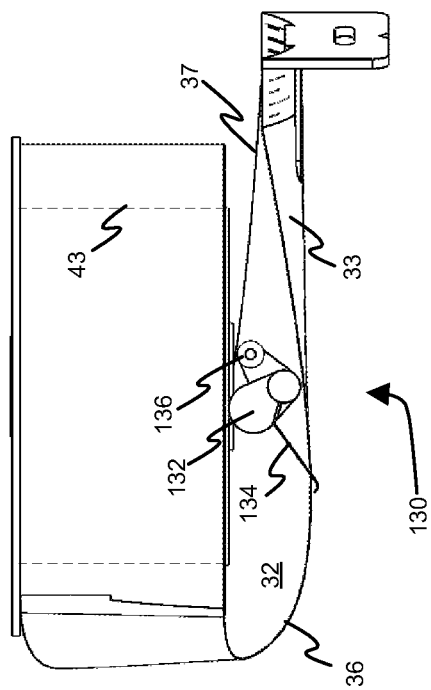
FIG. 14 provides a view of the tape measure from FIG. 1 with the brake engaged.
Figure 13:
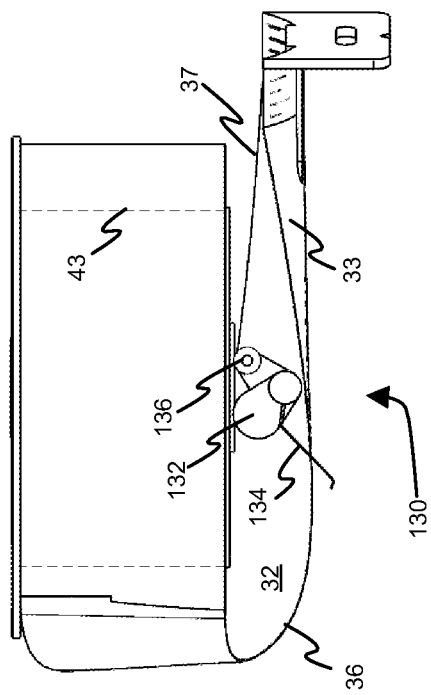
FIG. 13 provides a view of the tape measure from FIG. 1 with the brake disengaged.

As shown in greater detail in FIG. 11, the side roller 90 has a right, stepped or tiered frustum shape with circular cross sections. In particular, the side roller 90 includes a first or base tier 96 and a second tier 98. As shown, the base tier 96 may have a diameter $D_S$ that is greater than the diameter $D_{S2}$ of the second tier 98, and the second tier 98 may have a height $H_{S2}$ which collectively define an interface or groove 94. As noted above, the groove 94 may be configured to receive and engage the left edge 36 of the blade 30 as the blade 30 travels along the blade path. In one embodiment, the diameter $D_S$ of the base tier 96 is one inch, the diameter $D_{S2}$ of the second tier 98 is two-thirds inch, and the height $H_{S2}$ of the second tier 98 is 0.11 inches.

As shown, diameter the second tier 98 may increase at a constant rate as the second tier 98 extends from the base tier 96 so as to form a planar surface 99 that extends from the base tier 96 at an acute angle (e.g., 82.5°). However, in other embodiments, the diameter of the second tier 98 may increase at a non-constant rate so as to form a non-planar surface 99 (e.g., concave, convex, or curvilinear surface), or may remain constant so as to form a planar surface 99 that extends perpendicularly from the base tier 96.

Referring now to FIG. 8, the side guide member or roller 90 may be mounted such that its axis of rotation $R_S$ is nearly perpendicular to the left wall 26 and the axis of rotation $R_R$ of the reel 40. Moreover, the side roller 90 may be positioned such that its axis $R_S$ lies between the axis $R_R$ of the reel 40 and the front wall 24. Thus, the side roller 90, in one embodiment, may be positioned forward of the reel axis $R_R$. As shown in FIGS. 9 and 10, the outer diameter $D_S$ of the side roller 90 may be considerably smaller than the diameter $D_R$ of the reel 40 and roughly the same as the height $H_D$ of the drum 43. Furthermore, the side roller 90 may be positioned such that its inner groove 94 is vertically positioned between the lower end of the drum 43 and the inner groove 74 of the bottom roller 70. The side roller 90 may be further positioned such that its inner groove 94 is horizontally positioned roughly the width W of the blade 30 away from the left side 72 of the bottom roller 70.

The side roller 90 may be also positioned such that inner groove 74 generally aligns with the left edge 49 of the reel 40. As noted above, the axis $R_S$ of the side roller 90 is nearly perpendicular with the left wall 26. More specifically, the axis $R_S$ forms a compound angle with respect to the blade path. In one embodiment, the axis $R_S$ may be angled downward by 10° from the blade 30 as it extends from the casing 20. See, e.g., FIG. 9. Moreover, the axis $R_S$ may be angled forward by 3° from being perpendicular to the blade 30 as it extends from the casing 30. See, e.g., FIG. 8. Such angling of the side roller 90 may aid the groove 94 in engaging the left edge 36 of the blade 30

Figure 12:
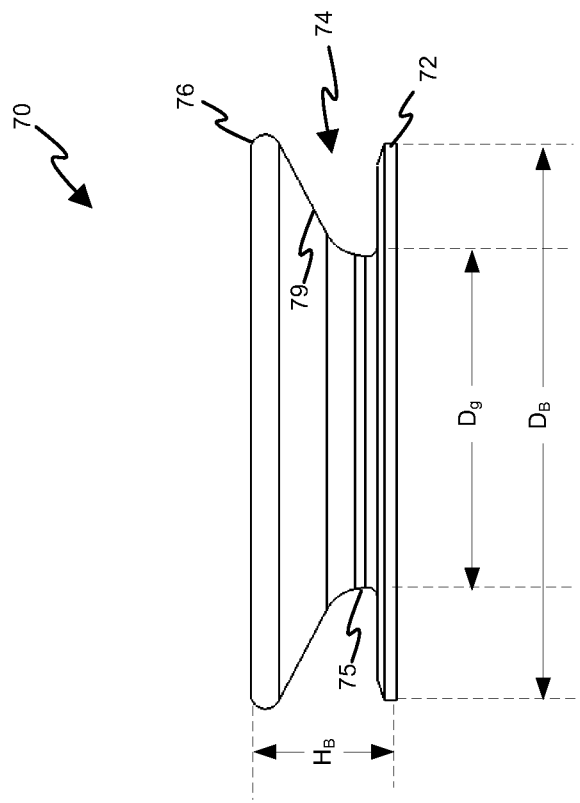
FIG. 12 provides a detailed view for the bottom roller of the tape measure from FIG. 1.

As shown in greater detail in FIG. 12, the bottom roller 70 has a general right, cylindrical shape with circular cross section and an inner groove 74 positioned between a lower end 72 and an upper end 76 of the roller 70. As shown, the upper and lower ends 72, 76 of the roller 70 have a diameter $D_B$ that is greater than the diameter $D_G$ of a base 75 of the groove 74. As noted above, the groove 74 may be configured to receive and engage the right edge 37 of the blade 30 as the blade 30 travels along the blade path. In one embodiment, the diameter $D_B$ of the upper and lower ends 72, 76 is 1.13 inch, the diameter $D_G$ of the groove 74 is two-thirds inch, and the height HB of the bottom roller 70 is 0.3 inches.

As shown, the diameter of the bottom roller 70 may decrease rapidly from the lower end 72 to a base 75 of the groove 74. Conversely, the diameter of the bottom roller 70 may decrease at a more gradual rate from the upper end 76 to the base 75 of the groove 74. In particular, the diameter may decrease at a relatively constant rate from the upper end 76 to the base 75 so as to form a planar surface 79 that extends at an acute angle (e.g., 28°) with respect to the upper end 76. However, in other embodiments, the diameter of the bottom roller 70 may decrease at a non-constant rate so as to form a non-planar surface 79 (e.g., concave, convex, or curvilinear surface). In operation, the right edge 37 of the blade 30 generally engages the angled surface 79 of the groove 74. The angled surface 79 helps direct the right edge 37 of the blade 30 toward the base 75 of the groove 74. As such, the angled surface 79 may aid in retaining the right edge 37 in the groove 74.

Referring back to FIGS. 5 and 6, the upper end 44, as explained above, may be capped with the disc 46. However, the lower end 45 of the drum 43, in one embodiment, does not include a corresponding disc. Instead, the reel 40 and coiled tape blade 30 act as another guide member or roller 100 that has a variable diameter. The guide roller 100 may aid in guiding the tape blade 30 between the bottom roller 70 and the side roller 90 as the tape blade 30 travels along the blade path. In particular, the diameter of the guide roller 100 decreases as the tape blade 30 is uncoiled from the reel 40 and extracted from the tape measure casing 20. Conversely, the diameter of the guide roller 100 increases as the tape blade 30 is coiled about the reel 40 and retracted into the tape measure casing 20. Such increasing/decreasing of the diameter results in a lower edge of the guide roller 100, which engages the upper face 32, the right edge 37, or both of the blade 30, having an angular rotation that closely matches the linear movement of the blade 30 as blade 30 travels along the blade path between a bottom roller 70 and a side roller 90.

As shown in FIG. 1-5, the tape measure 10 may further include a brake release button 110 that projects through a right-front corner of the casing 20. The brake release may 110 may actuate a brake 130 (See, FIGS. 13-18) that is used to maintain the blade 30 in an extended position. In one embodiment, a spring 41 within the drum 43 exerts a force that causes the reel 40 to automatically retract and coil the blade 30. The brake 130, in one embodiment, may be configured to automatically engage and lock the reel 40 against the retractive force of spring 41. Due to the brake 130, the tape measure 10 may be configured to retain the tape blade 30 in an extended position until the brake release button 110 is actuated and the brake 130 is released.

To this end, the brake 130 may include a cam 132 and spring 134. As shown, in FIGS. 13-17 the cam 132 may be positioned below the reel 40 and may be pivotally coupled to the bottom portion 21 of the casing via a pivot point 136. In the embodiment shown in FIGS. 13-15, the pivot point 136 provides an axis of rotation that is parallel to the lower end 44 of the drum 43. Due to the axis of rotation, the cam 132 may pivot vertically toward the lower end 44 of the drum 43 when rotated in a first direction and may pivot vertically away from the lower end 44 of the drum 43 when rotated in an opposite direction. In such an embodiment, the spring 134 may be configured to impart a biasing force upon the cam 132 which urges the cam 132 into contact with a lower horizontal surface of the drum 43.

The pivot point 136 may be placed ahead of the cam 132 with respect to the angular rotation of the drum 43 associated with retracting the blade 30. Due to such placement, when the reel 40 rotates in the direction of blade retraction, frictional forces between the lower surface of the drum 43 and the cam 132 cause the cam 132 to rotate about the pivot point 136 and upwardly toward the lower surface of the drum 43 thus increasing a braking force applied by the cam 132. See, e.g., FIG. 14 which depicts the cam 132 engaged with the lower surface of the drum 43 in a locked position. Furthermore, as a result of such placement, when the reel 40 rotates in the direction of blade extraction, frictional forces between the lower surface of the drum 43 and the cam 132 cause the cam 132 to pivot downwardly away from the lower surface of the drum 43, thus reducing a braking force applied by the cam 132. Accordingly, the blade 30 may be extended without pressing the brake release button 110 since extending the blade 30 reduces the braking force applied by the cam 132.

Figure 15:
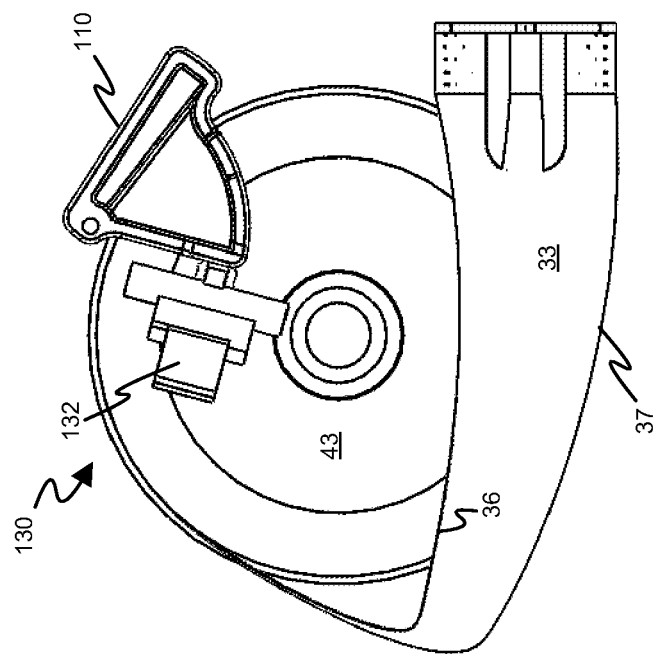
FIG. 15 provides a view of the bottom of the tape measure from FIG. 1 with the casing removed in order to depict details of the brake.

While extracting the blade 30 reduces the braking force, the cam 132 remains engaged with the lower surface of the drum 43. As a result, the brake 130 retains the blade 30 in the extended position despite the retractive force applied by spring 41 to the reel 40. In order to permit the spring 41 to rotated the reel 40 and retract the blade 30, the brake release button 110 may be coupled to the cam 132 as shown in FIG. 15. Pressing the button 110 causes the cam 132 to pivot away from the lower surface of the drum 43 and reduce the braking force. See, e.g., FIG. 13. With the braking force removed or reduced below the retractive force, the spring 41 may rotate the reel 40 and causes the blade 30 to retract into the casing 20 and coil around the drum 43.

Figure 16:
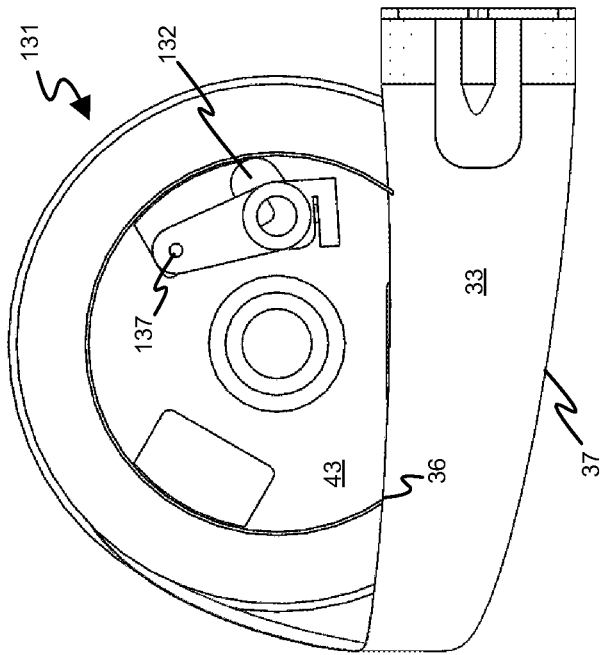
FIG. 16 provides a view of the bottom of the tape measure from FIG. 1 with the casing removed in order to depict details of another embodiment for the brake.
Figure 17:
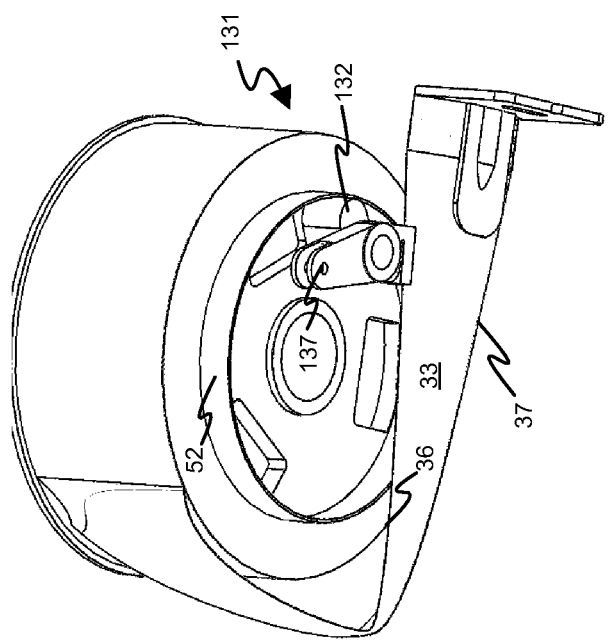
FIG. 17 provides a perspective view of the bottom of the tape measure from FIG. 1 with the casing removed in order to depict further details of the another embodiment for the brake.

Referring now to FIGS. 16 and 17, another embodiment of a brake 131 is shown. The brake 131 of FIGS. 16 and 17 operates in a similar manner to the brake 130 of FIGS. 13-15. However, the pivot point 137 of brake 131 may be parallel to the axis $R_R$ of rotation the reel 40. As such, spring 134 imports a force upon the cam 132 that urges the cam 132 radially outward toward an outer edge 52 of the drum 43. In such a position, the cam 132 applies a braking force to the drum 43 sufficient to retain the blade 30 in the extended position. Conversely, pressing the brake release button 110 causes the cam 132 to pivot radially inward and away from the outer edge 52 of the drum 43. Such pivoting reduces or removes the braking force applied to the drum 43 and permits the spring 41 to rotate the reel 40 and retract the blade 30.

Figure 18:
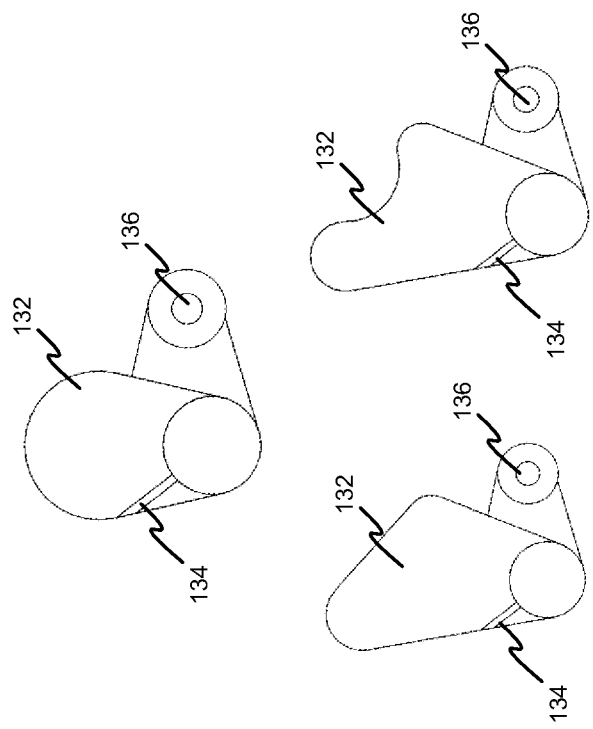
FIG. 18 shows various embodiments suitable for implementing the cam of the brake shown in FIGS. 13-17.

As should be appreciated, the cam 132 of FIGS. 13-17 may take many different forms. FIG. 18 provides various examples of suitable cams 132 for the brake 130 or 131. However, other shapes for cam 132 may be used.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment or embodiments disclosed, but that the present invention encompasses all embodiments falling within the scope of the appended claims.

What is claimed is:

1. A tape measure, comprising:
   a casing having a slot through a front wall of the casing;
   a reel rotatably mounted in the casing such that the reel has
      an axis of rotation that is perpendicular to a bottom wall
      of the casing;
   a measuring tape blade comprising:
      a first portion coiled around the reel such that an upper
         face of the measuring tape blade faces the axis of
         rotation for the reel; and
      a second portion that extends from the reel and through
         the slot such that the upper face of the measuring tape
         blade associated with the slot is directed upwardly
         and opposite an outer surface of the bottom wall; and
   a plurality of guide members configured to guide and twist
      the measuring tape blade as the measuring tape blade
      travels between the reel and the slot, wherein:
   the plurality of guide members comprises a bottom roller
      positioned between the reel and the bottom wall of the
      casing; and
   the bottom roller comprises a groove configured to receive
      an edge of the measuring tape blade.

2. The tape measure of claim 1, wherein the plurality of guide members further comprises a side roller positioned between a side of the reel and a side wall of the casing.

3. The tape measure of claim 1, wherein the side roller has an axis of rotation that extends from the side wall of the casing toward the reel.

4. The tape measure of claim 1, wherein:
   the reel comprises a drum having an upper end associated
      with a top wall of the casing and a lower end associated
      with the bottom wall of the casing;

the upper end of the drum comprises a disc that has a diameter greater than a diameter of the drum and that provides a lip that extends radially beyond the drum; and
the lip prevents an edge of the measuring tape blade from sliding past the upper end of the drum.

5. The tape measure of claim 1, further comprising a spring that applies a retractive force upon the reel that causes the reel to rotate and retract the measuring tape blade.

6. The tape measure of claim 5, further comprising a brake that applies a braking force sufficient to overcome the retractive force applied to the reel and retain the measuring tape blade in an extended position.

7. The tape measure of claim 6, further comprising a brake release button configured to reduce the braking force applied to the reel below the retractive force and permit the reel to retract the measuring tape blade.

8. The tape measure of claim 1, wherein the groove of the bottom roller runs parallel to the bottom wall of the casing.

9. A tape measure, comprising:
a casing having a slot through a front wall of the casing;
a reel rotatably mounted in the casing such that the reel has an axis of rotation that is perpendicular to a bottom wall of the casing;
a measuring tape blade comprising:
    a first portion coiled around the reel such that an upper face of the measuring tape blade faces the axis of rotation for the reel; and
    a second portion that extends from the reel and through the slot such that the upper face of the measuring tape blade associated with the slot is directed upwardly and opposite an outer surface of the bottom wall; and
a plurality of guide members configured to guide and twist the measuring tape blade as the measuring tape blade travels between the reel and the slot, wherein:
the plurality of guide members comprises a bottom roller positioned between the reel and the bottom wall of the casing; and
the bottom roller has an axis of rotation that is parallel to the axis of rotation of the reel.

10. The tape measure of claim 9, wherein the bottom roller comprises a groove configured to receive an edge of the measuring tape blade.

11. The tape measure of claim 10, wherein the groove of the bottom roller runs parallel to the bottom wall of the casing.

12. The tape measure of claim 9, wherein the axis of rotation of the bottom roller lies within a footprint of the reel with respect to the bottom wall of the casing.

13. The tape measure of claim 12, wherein the bottom roller comprises a back edge that lies between a back edge of the reel and a back wall of the casing that is opposite the front wall of the casing.

14. The tape measure of claim 9, further comprising:
a spring that applies a retractive force upon the reel that causes the reel to rotate and retract the measuring tape blade;
a brake that applies a braking force sufficient to overcome the retractive force applied to the reel and retain the measuring tape blade in an extended position; and
a brake release button configured to reduce the braking force applied to the reel below the retractive force and permit the reel to retract the measuring tape blade.

15. A tape measure, comprising:
a casing having a slot through a front wall of the casing;
a reel rotatably mounted in the casing such that the reel has an axis of rotation that is perpendicular to a bottom wall of the casing;
a measuring tape blade comprising:
    a first portion coiled around the reel such that an upper face of the measuring tape blade faces the axis of rotation for the reel; and
    a second portion that extends from the reel and through the slot such that the upper face of the measuring tape blade associated with the slot is directed upwardly and opposite an outer surface of the bottom wall; and
a plurality of guide members configured to guide and twist the measuring tape blade as the measuring tape blade travels between the reel and the slot, wherein:
the plurality of guide members comprises a bottom roller positioned between the reel and the bottom wall of the casing;
the side roller has an axis of rotation that extends from the side wall of the casing toward the reel; and
the side roller comprises a groove configured to receive an edge of the measuring tape blade.

16. The tape measure of claim 15, wherein:
the side roller comprises a stepped, frustum shape including a first tier and a second tier that extends from the first tier; and
the groove is formed by an interface between the first tier and the second tier of the side roller.

17. The tape measure of claim 16, wherein the second tier has a diameter that increases as the second tier extends from the first tier.

18. The tape measure of claim 15, further comprising:
a spring that applies a retractive force upon the reel that causes the reel to rotate and retract the measuring tape blade;
a brake that applies a braking force sufficient to overcome the retractive force applied to the reel and retain the measuring tape blade in an extended position; and
a brake release button configured to reduce the braking force applied to the reel below the retractive force and permit the reel to retract the measuring tape blade.

19. The tape measure of claim 15, wherein:
the bottom roller has an axis of rotation that is parallel to the axis of rotation of the reel; and
the axis of rotation of the bottom roller lies within a footprint of the reel with respect to the bottom wall of the casing.

20. The tape measure of claim 15, wherein:
the plurality of guide members further comprises a side roller positioned between a side of the reel and a side wall of the casing; and
the side roller has an axis of rotation that extends from the side wall of the casing toward the reel.

* * * * *